US009979627B2

(12) United States Patent
Shetty et al.

(10) Patent No.: US 9,979,627 B2
(45) Date of Patent: May 22, 2018

(54) SYSTEMS AND METHODS FOR BARE-METAL NETWORK TOPOLOGY DISCOVERY

(71) Applicant: Dell Products, L.P., Round Rock, TX (US)

(72) Inventors: Sudhir Vittal Shetty, Cedar Park, TX (US); Hendrich M. Hernandez, Round Rock, TX (US); Michael Brundridge, Round Rock, TX (US); Chandrasekhar Puthillathe, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 541 days.

(21) Appl. No.: 14/615,451

(22) Filed: Feb. 6, 2015

(65) Prior Publication Data
US 2016/0234095 A1 Aug. 11, 2016

(51) Int. Cl.
*H04L 12/751* (2013.01)

(52) U.S. Cl.
CPC .............. *H04L 45/02* (2013.01); *Y02B 60/43* (2013.01)

(58) Field of Classification Search
USPC .......... 709/224, 220, 204; 715/234; 707/725
See application file for complete search history.

(56) References Cited

U.S. PATENT DOCUMENTS

| 6,377,987 B1* | 4/2002 | Kracht | H04L 41/0213 370/254 |
|---|---|---|---|
| 8,626,913 B1* | 1/2014 | Chourey | G06Q 30/02 709/206 |
| 2011/0040917 A1* | 2/2011 | Lambert | H04L 69/18 710/301 |
| 2011/0282943 A1* | 11/2011 | Anderson | G06Q 10/06 709/204 |
| 2012/0011432 A1* | 1/2012 | Strutton | G06Q 30/02 715/234 |
| 2014/0280209 A1* | 9/2014 | Kivirauma | G06F 17/3089 707/748 |
| 2015/0052009 A1* | 2/2015 | Ketchell, III | G06Q 30/0633 705/26.8 |
| 2015/0253028 A1* | 9/2015 | Masuyama | G05B 15/02 700/276 |
| 2016/0063537 A1* | 3/2016 | Kumar Goel | G06Q 30/0244 705/14.43 |

(Continued)

*Primary Examiner* — Tammy Nguyen
(74) *Attorney, Agent, or Firm* — Fogarty LLP (57) ABSTRACT

Systems and methods for systems and methods for bare-metal network topology discovery. In an illustrative, non-limiting embodiment, an Information Handling System (IHS) may include a processor and a memory coupled to the processor, the memory having program instructions stored thereon that, upon execution by the processor, cause the IHS to: receive network topology information from a server, wherein the server is configured to collect at least one portion of the network topology information from one or more network devices via a baseboard management controller (BMC) circuit while the server operates in low-power mode; and provide a graphical display representing the network topology information, the graphical display including a representation of the server, the one or more network devices, and one or more connections between the server and the one or more network devices.

18 Claims, 2 Drawing Sheets

(56) References Cited

U.S. PATENT DOCUMENTS

2016/0094866 A1* 3/2016 Frazzini ............. H04N 21/2668
                                                725/10
2016/0179808 A1* 6/2016 De Napoli Ferreira ...................
                                              G06F 17/3089
                                                707/725
2016/0234095 A1* 8/2016 Shetty .................... H04L 45/02

* cited by examiner

SYSTEMS AND METHODS FOR BARE-METAL NETWORK TOPOLOGY DISCOVERY

FIELD

This disclosure relates generally to computer systems, and more specifically, to systems and methods for bare-metal network topology discovery.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS (e.g., a server) may be connected to a network, such as a Local Area Network (LAN), a Wide Area Network (WAN), or the like. The network may include a number of network devices coupled to each other with a certain structure or topology, which another IHS (e.g., a console) in communication with the server may then attempt to discover.

Conventionally, topology construction has been achieved by originating traffic from a server, for example, by booting the server to an Operating System (OS) instance, and having the OS generate traffic from each of the server's network ports. This procedure results in traffic that can be detected by a network device (e.g., a switch), such that the network device acquires the media access control address (MAC address) of the server's source port. The source MAC address can then be provided by the network device to a console in response to a query, and the console may then attempt to correlate the server port MAC address with the switch port with the information received from the switch.

The inventors hereof have recognized, however, that the conventional approach to topology discovery requires going through the expensive operation of booting the server to an OS to simulate traffic, enumerating and simulating traffic through all of the network ports, etc. Moreover, if the discovery boot is done during initial discovery, the information often becomes outdated during the life of the network, for instance, after re-cabling and/or swapping out of hardware.

SUMMARY

Embodiments of systems and methods for bare-metal network topology discovery are described herein. In an illustrative, non-limiting embodiment, an Information Handling System (IHS) may include An Information Handling System comprising: a processor; and a memory coupled to the processor, the memory having program instructions stored thereon that, upon execution by the processor, cause the IHS to: receive network topology information from a server, where the server is configured to collect at least one portion of the network topology information from one or more network devices via a baseboard management controller (BMC) circuit while the server operates in low-power mode; and provide a graphical display representing the network topology information, the graphical display including a representation of the server, the one or more network devices, and one or more connections between the server and the one or more network devices.

In some implementations, the network topology information may include an association between: (a) a identification and port of a network device, and (b) a corresponding identification and port of a network interface of the server; where the network device and the server are connected via a wire. For example, the identification and port of the network device may be received in a packet provided by the network device, the packet having a Type-Length-Value (TLV) format. Also, the packet may be provided by the network device following the Link Layer Discovery Protocol (LLDP).

The network interface may include at least one of: a Peripheral Component Interconnect (PCI) card, a PCI Express (PCIe) card, or a Local Area Network (LAN)-on-motherboard (LOM) card. Additionally or alternatively, the network interface may be configured to receive the at least one portion of network topology information provided by the network device in response to the wire being physically connected between the server and the network device. Additionally or alternatively, the network interface may be configured to receive the network topology information provided by the network device in the absence of a query by the server.

The BMC may be configured to collect the network topology information from the network interface by querying the network interface via a sideband channel while the server operates in low-power mode. Additionally or alternatively, the BMC may be configured to construct each LLDP packet and send it via the side-band channel to the network interface via a Network Controller Sideband Interface (NC-SI) original equipment manufacturer (OEM) command, where the NC-SI OEM command includes first information about the server and second information about the network interface port, the first information including a service tag and the second information including a media access control address (MAC address) and a Fully Qualified Descriptor (FQDD).

For instance, the low-power mode may include a G0 or G1 mode under the Advanced Configuration and Power Interface (ACPI) specification. Moreover, may further cause the IHS to receive network topology information from the server prior to the server booting an Operating System (OS). The one or more network devices may include at least one of: a switch, a router, a repeater, a bridge, a hub, or an access point, and the IHS may include a management console available to a network administrator.

In another illustrative, non-limiting embodiment, a computer-implemented method, may include: performing, by a server, a bare-metal network topology discovery operation, where the operation includes collecting, by the server, at least one portion of network topology information from one or more network devices via a BMC circuit while the server operates in low-power mode; and providing, by the server, the network topology information to a management console, the management console configured to provide a graphical display representing the network topology information, the graphical display including a representation of the server, the one or more network devices, and one or more connections between the server and the one or more network devices.

The at least one portion of network topology information may include an association between an identification and port of a network device, where the network device and the server are connected via the port. The network interface may be configured to receive the at least one portion of network topology information provided by the network device in response to a cable being physically connected between the server and the network device and in the absence of a query by the server. Also, the BMC may be configured to collect the network topology information from the network interface by querying the network interface via a sideband channel while the server operates in low-power mode.

The low-power mode includes a G0 or G1 mode under the ACPI specification mode. The program instructions, upon execution by the processor, may further cause the IHS to receive network topology information from the server prior to the server booting an OS.

In yet another illustrative, non-limiting embodiment, a non-transitory computer-readable medium may have program instructions stored thereon that, upon execution by an IHS, cause the IHS to: collect at least one portion of network topology information from one or more network devices via a BMC circuit while operating in a standby or sleep mode; and provide the network topology information to a management console, the management console configured to provide a graphical display representing the network topology information, the graphical display including a representation of the IHS, the one or more network devices, and one or more connections between the IHS and the one or more network devices.

The network interface may be configured to receive the at least one portion of network topology information provided by the network device in response to the wire being physically connected between the IHS and the network device, in the absence of a query by the IHS, and prior to the IHS booting an OS; and where the BMC is configured to collect the network topology information from the network interface by querying the network interface via a sideband channel while the IHS operates in low-power mode.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods for bare-metal network topology discovery are described. As used herein, the term "bare-metal" refers to an Information Handling System (IHS) operating independently and/or without an Operating System (OS), for example, prior to the OS being booted. For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a handheld device, personal computer, a server, a network storage device, or any other suitable device and may vary in size, shape, performance, functionality, and price. The IHS may include random access memory (RAM), one or more processing resources such as a CPU or hardware or software control logic, ROM, and/or other types of nonvolatile memory. Additional components of the IHS may include one or more disk drives, one or more network ports for communicating with external devices as well as various I/O devices, such as a keyboard, a mouse, and a video display. The IHS may also include one or more buses operable to transmit communications between the various hardware components.

Broadly speaking, the inventors hereof have identified a need for visually displaying physical connectivity between IHSs (e.g., servers) and adjacent network devices (e.g., switches, routers, repeaters, bridges, hubs, access points, etc.). For example, in many situations it may desirable to display connectivity for Local Area Network (LAN)-onto-motherboard (LOM), Network Daughter Cards (NDCs), Peripheral Component Interconnect Express (PCIe), and/or PCI Mezzanine Card (PMC) cards. These features can enable an Information Technology (IT) administrator to visualize the topology connectivity between IHSs and network devices.

In some embodiments, in order to provide bare-metal network topology discovery, a console may discover server(s) and switch(es), for example. A server and a switch may be automatically discovered by plugging into the network fabric. Switches originate Link Layer Discovery Protocol (LLDP) traffic (on port LINK Status change) on ports that connect to the servers.

The switch-originated traffic may include the following type-length-value (TLV) packets encoded in the LLDP payload: (a) a chassis Identifier, which corresponds to a unique identifier for the switch (e.g., switch media access control address (MAC address)), and (b) a port identifier, which is an identifier for the switch port—the LLDP payload gets periodically transmitted by the switch to ensure that it has been received by the server.

The server's network interface card (NIC) port receives and stores LLDP payload information. A baseboard management controller (BMC controller) queries the NIC port (via sideband channel(s)) for the identifying information about the switch port, and exposes that information as attributes of the NIC port. The console queries the BMC controller for neighbor information, for example, using the Web Services-Management (WS-Management) protocol. Finally, the console correlates the NIC port with the switch port and displays the physical connection between the server and the switch to and administrator.

In some embodiments, the foregoing systems and methods may provide topology connectivity (e.g., server port to switch port) information that can be queried via a BMC controller through different remote interfaces. As such, these systems and methods opens up more advanced use cases around workload placement based on network connectivity. Also, as previously noted, the construction of the topology may be achieved in a bare-metal scenario and does not need, as would otherwise be conventionally required, execution of an OS instance (e.g., a discovery OS instance) to generate traffic from the server.

In the following detailed description of exemplary embodiments of the disclosure, specific exemplary embodiments in which the disclosure may be practiced are described in sufficient detail a person of ordinary skill in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
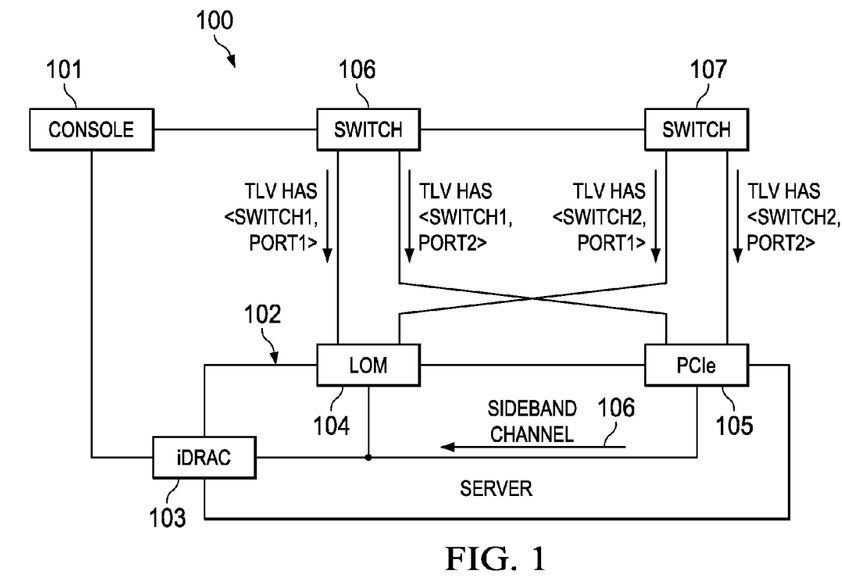
FIG. 1 is a block diagram of an example of a system configured to perform a bare-metal network topology discovery operation according to some embodiments.

FIG. 1 is a block diagram of an example of system 100 designed to perform a bare-metal network topology discovery operation according to some embodiments. Particularly, console 101 may be configured to implement methods for discovery and visually displaying connections between server 102 and switches 106 and 107.

Server 102 includes BMC 103 (referred to as integrated Dell Remote Access Controller or (iDRAC) in this example), LOM 104, and PCIe card or interface 105. Both LOM 104 and PCIe 105 are coupled to iDRAC 103 via sideband channel 106. Sideband channel 106 may include, for example, a Network Controller Sideband Interface (NC-SI) following the Distributed Management Task Force (DMTF) specification.

In some scenarios, server 102 may be operating in a "low-power" state following the Advanced Configuration and Power Interface (ACPI) specification. The ACPI specification defines four Global "Gx" states and six Sleep "Sx" states for an ACPI-compliant IHS:

- G0 (S0) or "away mode" is a subset of S0, where the IHS' display, if any, is off but background tasks are running.
- G1 or "sleeping" is divided into four states, S1 through S4. In S1 or "Power on Suspend" (POS): All the processor caches are flushed, and the CPU(s) stops executing instructions. The power to the CPU(s) and RAM is maintained. Devices that do not indicate they must remain on, may be powered off. In S2, the CPU is powered off. Dirty cache is flushed to RAM. S3 is commonly referred to as Standby, Sleep, or Suspend to RAM (STR): RAM remains powered. In S4, "hibernation" or "Suspend to Disk," content of the main memory is saved to non-volatile memory such as a hard drive, and is powered down.
- G2 (S5) or "Soft Off" is almost the same as G3 Mechanical Off, except that the power supply unit (PSU) still supplies power, at a minimum, to the power button to allow return to S0. A full reboot is needed, and no previous content is retained. Other components may remain powered so the computer can "wake" on input from the keyboard, clock, modem, LAN, or USB device.
- In G3 or "Mechanical Off," the IHS's power has been totally removed via a mechanical switch (as on the rear of a PSU). The power cord can be removed and the system is safe for disassembly (typically, only the real-time clock continues to run using its own battery).

When server 102 operates in a low-power state, it may be generally referred to as being in "sleep mode" or "standby." In embodiments employing the ACPI specification, these low-power states may correspond to global states G1 (S1-S4) or G2 (S5). That is, iDRAC 103, LOM 104, and PCIe 105 may receive auxiliary power from server 102's power supply (not shown) and may therefore be at least partially operational. In operation, system 100 may perform one or more operations described in method 200 of FIG. 2 described in detail below.

Figure 2:
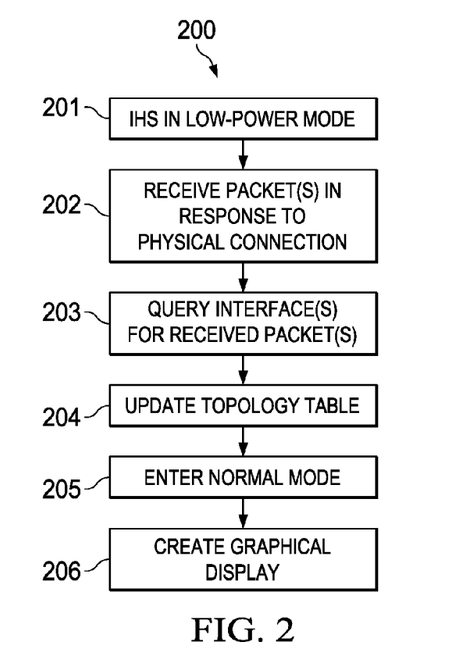
FIG. 2 is a block diagram of an example of a method for performing a bare-metal network topology discovery operation according to some embodiments.

FIG. 2 is a block diagram of an example of method 200 for performing bare-metal network topology discovery. In some embodiments, method 200 may be executed, at least in part, by system 100 of FIG. 1. At bock 201, an IHS (e.g., server 102) may be set to a low-power mode. At block 202, in response to a network cable or wire being plugged between LOM 104 and switch 106, LOM 104 may automatically receive a packet (e.g., a Link Layer Discovery Protocol (LLDP) packet) from switch 106 having a TLV that indicates a switch identifier and a port for that physical connection ("switch 1" and "Port1"). Similarly, in response to another network cable or wire being plugged between PCIe 105 and switch 107, PCIe 105 may automatically receive another packet from switch 106 having a TLV that indicates the switch identifier and another port for that connection ("switch 1" and "Port2").

The same process is repeated for switch 107—that is, in response to a network cable or wire being plugged between LOM 104 and switch 107, LOM 104 may automatically receive yet another packet from switch 107 having a TLV that indicates a switch identifier and a port for that physical connection ("switch 2" and "Port1") and, in response to another network cable or wire being plugged between PCIe 105 and switch 107, PCIe 105 may automatically receive still another packet from switch 107 having a TLV that indicates the switch identifier and another port for that connection ("switch 2" and "Port2").

In some cases, each packet received by server 102's network interface(s) may be associated with that interface's own identification and port. For instance, the packet indicating "switch 1" and "Port1" may be associated with a unique identifier that is associated with the port on the LOM such as a Fully Qualified device descriptor (e.g., NIC.Integrated.1-1—identifying the first port of the Integrated NIC or LOM) thus forming a "connection identification pair" that characterizes a physical connection between LOM 104 and switch 106.

If the network cable connecting Port 3 of LOM 104 and Port 1 of switch 106 are changed on either end (e.g., a user unplugs the cable from one connector and plugs it into another connector), switch 106 may again send another LLDP packet having updated connection information, and LOM 104 may create a new connection identification pair corresponding to the newly established physical connection.

At block 203, iDRAC 103 may query LOM 104 and PCIe 105 for connection identification pair information via sideband channel 106, and may receive that information via the same channel 106. At block 204, console 101 may receive the connection identification pair collected by iDRAC 103, for example, in response to a query, and may update a table with physical connections between server 102 and switches 106 and 107.

In some cases, after the collection of connection identification pairs by console 101, server 102 may enter a normal operation mode at block 105, for example, using full power. Either way, at block 206, console 101 may display a graphical representation of the connection identification pairs. For example, in some embodiments the graphical display may resemble system 100 of FIG. 1.

In other embodiments, the collection of connection identification pairs may be performed by switches 106 and/or 107, alternatively or addition to the collection performed by server 102. In such a scenario, server 102 may send packets to switches 106 and/or 107 in response to physical connections being made between LOM 104, PCIe 105, and switches 106 and/or 107, for example, when server 102 is operating in low-power mode, and console 101 may query switches 106 and/or 107 for the connection identification pairs collected by switches 106 and/or 107.

The iDRAC 103 may construct each LLDP packet and send it via the side-band channel to the LOM/PCIe network interfaces via a custom Network Controller Sideband Interface (NC-SI) original equipment manufacturer (OEM) command. The command may include identifying information about the server (e.g., the service tag), and information about the NIC port (e.g., MAC address and NIC port Fully Qualified Descriptor (FQDD)).

In some embodiments, bare-metal discovery via BMC 103 may identify any network interface card (add-in adapter) installed in a server, even when such interface cards is not connected, or its link is down. The console 101 may be configured to indicate that such network interface card exist in a particular server, but show its connection as being down. Once the connection is (re)established, the console 101 can be updated by the BMC 103.

Figure 3:
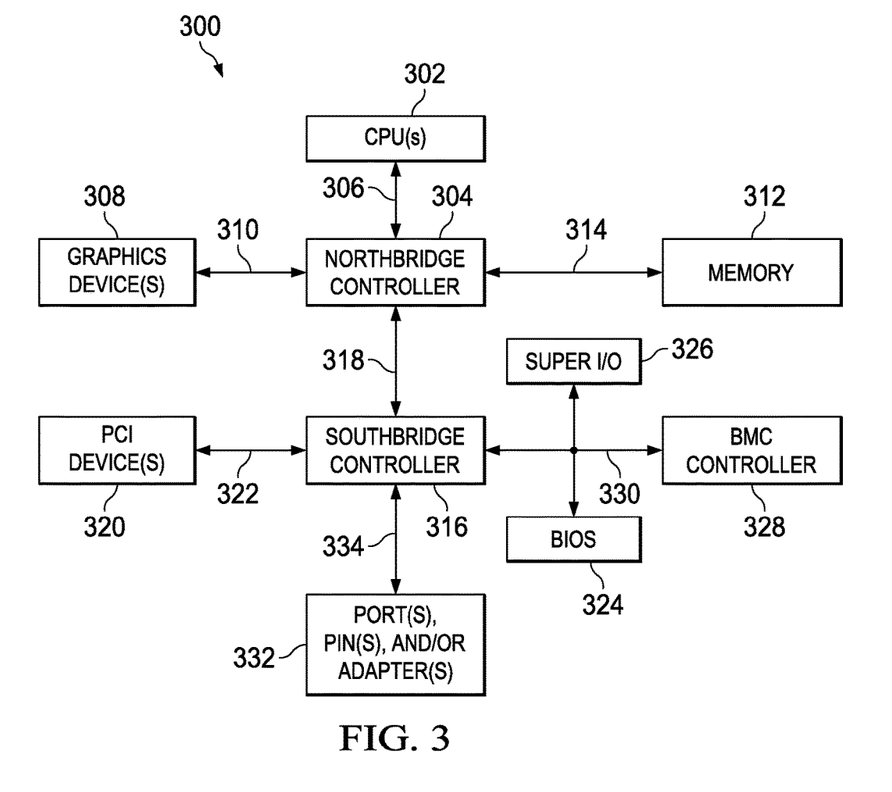
FIG. 3 is a block diagram illustrating an example of an IHS configured to perform bare-metal network topology discovery according to some embodiments.

FIG. 3 is a block diagram illustrating an example of an IHS configured to perform bare-metal network topology discovery according to some embodiments. IHS 300 is an instance of console 101 and/or server 102 illustrated in FIG. 1. As shown, IHS 300 includes one or more CPUs 302. In various embodiments, IHS 300 may be a single-processor system including one CPU 302, or a multi-processor system including two or more CPUs 302 (e.g., two, four, eight, or any other suitable number). CPU(s) 302 may include any processor capable of executing program instructions. For example, in various embodiments, CPU(s) 302 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 302 may commonly, but not necessarily, implement the same ISA. In an embodiment, a motherboard configured to provide structural support, power, and electrical connectivity between the various aforementioned components. Such a motherboard may include multiple connector sockets in various configurations, adapted to receive pluggable circuit cards, component chip packages, etc.

CPU(s) 302 are coupled to northbridge controller or chipset 304 via front-side bus 306. Northbridge controller 304 may be configured to coordinate I/O traffic between CPU(s) 302 and other components. For example, in this particular implementation, northbridge controller 304 is coupled to graphics device(s) 308 (e.g., one or more video cards or adaptors, etc.) via graphics bus 310 (e.g., an Accelerated Graphics Port or AGP bus, a Peripheral Component Interconnect or PCI bus, etc.). Northbridge controller 304 is also coupled to system memory 312 via memory bus 314. Memory 312 may be configured to store program instructions and/or data accessible by CPU(s) 302. In various embodiments, memory 312 may be implemented using any suitable memory technology, such as static RAM (SRAM), synchronous dynamic RAM (SDRAM), nonvolatile/Flash-type memory, or any other type of memory.

Northbridge controller 304 is coupled to southbridge controller or chipset 316 via internal bus 318. Generally, southbridge controller 316 may be configured to handle various of computing device 300°s I/O operations, and it may provide interfaces such as, for instance, Universal Serial Bus (USB), audio, serial, parallel, Ethernet, etc., via port(s), pin(s), and/or adapter(s) 232 over bus 234. For example, southbridge controller 316 may be configured to allow data to be exchanged between computing device 300 and other devices, such as other IHSs attached to a network. In various embodiments, southbridge controller 316 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 316 may also enable connection to one or more keyboards, keypads, touch screens, scanning devices, voice or optical recognition devices, or any other devices suitable for entering or retrieving data. Multiple I/O devices may be present in computing device 300. In some embodiments, I/O devices may be separate from IHS 300 and may interact with IHS 300 through a wired or wireless connection. As shown, southbridge controller 316 is further coupled to one or more PCI devices 320 (e.g., modems, network cards, sound cards, video cards, etc.) via PCI bus 332. Southbridge controller 316 is also coupled to Basic I/O System (BIOS) 324, Super I/O Controller 326, and Baseboard Management Controller (BMC) 328 via Low Pin Count (LPC) bus 230.

BIOS 324 includes non-volatile memory having program instructions stored thereon. Those instructions may be usable CPU(s) 302 to initialize and test other hardware components and/or to load an Operating System (OS) onto computing device 300. As such, BIOS 324 may include a firmware interface that allows CPU(s) 302 to load and execute certain firmware, as described in more detail below. In some cases, such firmware may include program code that is compatible with the Unified Extensible Firmware Interface (UEFI) specification, although other types of firmware may be used.

BMC controller 328 may include non-volatile memory having program instructions stored thereon that are usable by CPU(s) 302 to enable remote management of IHS 300. For example, BMC controller 328 may enable a user to discover, configure, and manage BMC controller 328, setup configuration options, resolve and administer hardware or software problems, etc. Additionally or alternatively, BMC controller 328 may include one or more firmware volumes, each volume having one or more firmware files used by the BIOS' firmware interface to initialize and test components of computing device 300.

Super I/O Controller 326 combines interfaces for a variety of lower bandwidth or low data rate devices. Those devices may include, for example, floppy disks, parallel ports, keyboard and mouse, temperature sensor and fan speed monitoring, etc. For example, the super I/O controller 326 may be coupled to the one or more upstream sensors 306 and to the one or more downstream sensors 308.

In some cases, IHS 300 may be configured to access different types of computer-accessible media separate from memory 312. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to computing device 300 via northbridge controller 304 and/or southbridge controller 316.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that computing device 300 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 304 may be combined with southbridge controller 316, and/or be at least partially incorporated into CPU(s) 302. In other implementations, one or more of the devices or components shown in FIG. 3 may be absent, or one or more other components may be added. Accordingly, systems and methods described herein may be implemented or executed with other computer system configurations. In some cases, various elements shown in FIG. 3 may be enclosed within a chassis or the like.

A person of ordinary skill in the art will recognize that IHS 300 of FIG. 3 is only an example of a system in which the present embodiments may be utilized. Indeed, the present embodiments may be used in various electronic devices, such as network router devices, televisions, custom telecommunications equipment for special purpose use, etc.

In the above described flowcharts, one or more of the methods may be embodied in a memory device or computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable a person of ordinary skill in the art to understand the disclosure for various embodiments with various modifications as are suited to the particular use contemplated.

The invention claimed is:

1. An Information Handling System (IHS), comprising:
a processor; and
a memory coupled to the processor, the memory having program instructions stored thereon that, upon execution by the processor, cause the IHS to:
receive network topology information from a server, wherein the server is configured to collect at least one portion of the network topology information from one or more network devices via a baseboard management controller (BMC) circuit while the server operates in low-power mode; and
provide a graphical display representing the network topology information, the graphical display including a representation of the server, the one or more network devices, and one or more connections between the server and the one or more network devices, wherein the identification and port of the network device are received in a packet provided by the network device following the Link Layer Discovery Protocol (LLDP), and wherein the BMC is configured to construct each LLDP packet and send it via a sideband channel to the network interface using a Network Controller Sideband Interface (NC-SI) original equipment manufacturer (OEM) command including first information about the server and second information about the network interface port, the first information including a service tag and the second information including a media access control (MAC) address and a Fully Qualified Descriptor (FQDD).

2. The IHS of claim 1, wherein the network topology information includes an association between: (a) an identification and port of a network device, and (b) a corresponding identification and port of a network interface of the server; wherein the network device and the server are connected via a wire.

3. The IHS of claim 2, wherein the packet has a Type-Length-Value (TLV) format.

4. The IHS of claim 2, wherein the network interface includes at least one of: a Peripheral Component Interconnect (PCI) card, a PCI Express (PCIe) card, or a Local Area Network (LAN) -on-motherboard (LOM) card.

5. The IHS of claim 4, wherein the network interface is configured to receive the at least one portion of network topology information provided by the network device in response to the wire being physically connected between the server and the network device.

6. The IHS of claim 5, wherein the network interface is configured to receive the network topology information provided by the network device in the absence of a query by the server.

7. The IHS of claim 6, wherein the BMC is configured to collect the network topology information from the network interface by querying the network interface via the sideband channel.

8. The IHS of claim 7, wherein the low-power mode includes a G0 or G1 mode under the Advanced Configuration and Power Interface (ACPI) specification.

9. The IHS of claim 1, wherein the program instructions, upon execution by the processor, cause the IHS to receive network topology information from the server prior to the server booting an Operating System (OS).

10. The IHS of claim 1, wherein the one or more network devices include at least one of: a switch, a router, a repeater, a bridge, a hub, or an access point, and wherein the IHS includes a management console available to a network administrator.

11. A computer-implemented method, comprising:
performing, by a server, a bare-metal network topology discovery operation, wherein the operation includes collecting, by the server, at least one portion of network topology information from one or more network devices via a baseboard management controller (BMC) circuit while the server operates in low-power mode; and
providing, by the server, the network topology information to a management console, the management console configured to provide a graphical display representing the network topology information, the graphical display including a representation of the server, the one or more network devices, and one or more connections between the server and the one or more network devices, wherein the identification and port of the network device are received in a packet provided by the network device following the Link Layer Discovery Protocol (LLDP), and wherein the BMC is configured to construct each LLDP packet and send it via a sideband channel to the network interface using a Network Controller Sideband Interface (NC-SI) original equipment manufacturer (OEM) command including first information about the server and second information about the network interface port, the first information including a service tag and the second information including a media access control (MAC) address and a Fully Qualified Descriptor (FQDD).

12. The computer-implemented method of claim 11, wherein the at least one portion of network topology information includes an association between an identification and a port of a network device, wherein the network device and the server are connected via the port.

13. The computer-implemented method of claim 11, wherein the network interface is configured to receive the at least one portion of network topology information provided by the network device in response to a cable being physically connected between the server and the network device and in the absence of a query by the server.

14. The computer-implemented method of claim 11, wherein the BMC is configured to collect the network topology information from the network interface by querying the network interface via the sideband channel.

15. The computer-implemented method of claim 14, wherein the low-power mode includes a G0 or G1 mode under the Advanced Configuration and Power Interface (ACPI) specification mode.

16. The computer-implemented method of claim 11, wherein the program instructions, upon execution by the processor, cause the IHS to receive network topology information from the server prior to the server booting an Operating System (OS).

17. A non-transitory computer-readable medium having program instructions stored thereon that, upon execution by an Information Handling System (IHS), cause the IHS to:
 collect at least one portion of network topology information from one or more network devices via a baseboard management controller (BMC) circuit while operating in a standby or sleep mode; and
 provide the network topology information to a management console, the management console configured to provide a graphical display representing the network topology information, the graphical display including a representation of the IHS, the one or more network devices, and one or more connections between the IHS and the one or more network devices, wherein the identification and port of the network device are received in a packet provided by the network device following the Link Layer Discovery Protocol (LLDP), and wherein the BMC is configured to construct each LLDP packet and send it via a sideband channel to the network interface using a Network Controller Sideband Interface (NC-SI) original equipment manufacturer (OEM) command including first information about the server and second information about the network interface port, the first information including a service tag and the second information including a media access control (MAC) address and a Fully Qualified Descriptor (FQDD).

18. The non-transitory computer-readable medium of claim 17, wherein the network interface is configured to receive the at least one portion of network topology information provided by the network device in response to the wire being physically connected between the IHS and the network device, in the absence of a query by the IHS, and prior to the IHS booting an Operating System (OS); and wherein the BMC is configured to collect the network topology information from the network interface by querying the network interface via the sideband channel.

* * * * *